US007239120B2

(12) United States Patent
Adragna et al.

(10) Patent No.: US 7,239,120 B2
(45) Date of Patent: Jul. 3, 2007

(54) DEVICE FOR POWER FACTOR CORRECTION IN FORCED SWITCHING POWER SUPPLY UNITS

(75) Inventors: Claudio Adragna, Monza (IT); Mauro Fagnani, Nerviano (IT); Giuseppe Gattavari, Busto Arsizio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/255,074

(22) Filed: Oct. 20, 2005

(65) Prior Publication Data

US 2006/0103364 A1    May 18, 2006

(30) Foreign Application Priority Data

Oct. 21, 2004    (IT)    ............... MI2004A2004

(51) Int. Cl.
*G05F 1/70* (2006.01)
*H02M 7/155* (2006.01)

(52) U.S. Cl. ............. 323/285; 323/284; 323/299; 363/89

(58) Field of Classification Search ........ 323/207–210, 323/222–224, 282, 284, 285, 299; 363/80, 363/81, 82, 89
See application file for complete search history.

(56) References Cited

U.S. PATENT DOCUMENTS 5,489,837 A * 2/1996 Arakawa ............... 323/207
5,828,206 A * 10/1998 Hosono et al. ......... 323/273
6,031,364 A * 2/2000 Hosono et al. ......... 323/280
6,744,243 B2 * 6/2004 Daniels et al. ......... 323/284

FOREIGN PATENT DOCUMENTS

GB    2366395    3/2002

OTHER PUBLICATIONS

Comandatore, et al., "Designing A High Power Factor Switching Converter Preregulator With The L4981 Continuous Mode," SGS-Thomson Microelectronics Application Note, 1997, pp. 1-23, XP002183394.
Various Authors, "L6563 - Advanced Transition-Mode PFC Contoller," ST Datasheet, Nov. 13, 2004, pp. 1-37, XP002425751, http://pdf1.alldatasheet.com/datasheet-pdf/view/158050/STMICROELECTRONICS/L6563.
European Search Report for Application No. EP 05109431.

* cited by examiner

*Primary Examiner*—Gary L Laxton
(74) *Attorney, Agent, or Firm*—Lisa K. Jorgenson; Stephen Bongini; Fleit Kain Gibbons Gutman Bongini & Bianco P.L.

(57) ABSTRACT

A device for power factor correction in a forced switching power supply unit is provided. The device includes a converter and a control device coupled to the converter so as to obtain from an input alternating mains voltage a direct regulated voltage on the output terminal. The converter includes a power transistor, and the control device includes an error amplifier having its inverting terminal coupled to a first signal that is proportional to the regulated voltage and its non-inverting terminal coupled to a reference voltage. A drive circuit of the power transistor is coupled to the output terminal of the error amplifier. The control device also includes a circuit for generating a current signal that is representative of the effective input voltage. The current signal is coupled to the inverting terminal of the error amplifier to vary the regulated voltage in reply to variations in the effective input voltage.

15 Claims, 2 Drawing Sheets

DEVICE FOR POWER FACTOR CORRECTION IN FORCED SWITCHING POWER SUPPLY UNITS

CROSS-REFERENCE TO RELATED APPLICATIONS

This application is based upon and claims priority from prior Italian Patent Application No. MI2004A002004, filed Oct. 21, 2004, the entire disclosure of which is herein incorporated by reference.

FIELD OF THE INVENTION

The present invention relates to a device for power factor correction in forced switching power supply units.

BACKGROUND OF THE INVENTION

There are conventional devices for the active power factor correction (PFC) for forced switching power supply units used in commonly used electronic devices such as computers, televisions, and monitors, and for supplying fluorescent lamps, that is forced switching pre-regulation stages whose task is to absorb a nearly sinusoidal current from the mains which is also in phase with the mains voltage. Therefore a forced switching power supply unit of the present type comprises a PFC and a converter of direct current into direct current (or "DC-DC converter") connected to the output of the PFC.

A forced switching power supply unit of the traditional type comprises a DC-DC converter and an input stage connected to the electricity distribution mains constituted by a full-wave rectifying diode bridge and a capacitor that is connected immediately downstream so as to produce a non-regulated direct voltage starting from the sinusoidal mains alternating voltage. The capacity of the capacitor is so big that at its terminals there is a relatively small ripple in relation to the continuous level. The rectifying diodes of the bridge, thus, will only conduct for a small portion of each half cycle of the mains voltage, given that the instantaneous value of this is lower than the voltage on the capacitor for the majority of the cycle. Thus, the current absorbed by the mains will be constituted by a series of narrow pulses whose amplitude is 5–10 times the resulting average value.

This presents considerable consequences: the current absorbed by the line has much greater peak values and effectiveness in comparison to the case of absorption of sinusoidal current, the mains voltage is distorted by effect of the almost simultaneous impulsive absorption of all the users connected to the network, in the case of three-phase systems the current in the neutral conductor is greatly increased, and there is a low use of the energetic potentials of the electricity producing system. In fact, the pulse current waveform has abundant odd harmonics which, even though they do not contribute to the power delivered to the load, contribute to increase the effective current absorbed by the mains and thus to increase the dissipation of energy.

In quantitative terms all this can be expressed both in terms of Power Factor (PF), intended as a ratio between the real power (that which the power supply unit gives to the load plus that dissipated within in the form of heat) and the apparent power (the product of the effective mains voltage and the effective current absorbed), and in terms of Total Harmonic Distortion (THD), generally intended as a percentage ratio between the energy associated with all the higher order harmonics and that associated with the fundamental harmonic. Typically, a power supply unit with a capacitive filter has a PF between 0.4–0.6 and a THD greater than 100%.

A PFC, placed between the rectifier bridge and the input of the DC-DC converter, permits the absorption from the mains of a nearly sinusoidal current that is also in phase with the voltage, making the PF near 1 and reducing the THD.

FIG. 1 shows a pre-regulator stage PFC comprising a boost converter 20 and a control device 1. In this case the control device is a L4981A control device produced by STMicroelectronics S.p.A. The boost converter 20 comprises a full-wave diode rectifier bridge 2 receiving at its input a mains voltage Vin, a capacitor C1 (that acts as a filter for the high frequency) having its terminals connected to the terminals of the diode bridge 2, an inductance L connected to a terminal of the capacitor C1, a MOS power transistor M having its drain terminal connected to a terminal of the inductance L that is downstream of the inductance and having its source terminal connected to ground, a diode D having its anode connected to the common terminal of the inductance L and the transistor M and its cathode connected to another capacitor Co, which has its other terminal connected to ground. The boost converter 20 generates at its output a direct voltage Vout on the capacitor Co which is greater than the maximum mains peak voltage, typically 400 V for systems supplied with European mains or with universal supply. This voltage Vout is the input voltage of the DC-DC converter connected to the PFC.

The boost converter also comprises a detecting resistor Rs that is connected between the source terminal of the transistor M and a terminal of the diode bridge 2 that closes the circuit permitting the reading of the current that flows through the inductor L.

The control device 1 must keep the output voltage Vout at a constant value through a feedback control action. The control device 1 comprises an operational error amplifier 3 for comparing a part of the output voltage Vout, that is the voltage Vr given by Vr=R2*Vout/(R2+R1) (where the resistors R1 and R2 are connected in series and in parallel with the capacitor Co), with a reference voltage Vref, for example of 2.5V. The error amplifier 3 generates an error signal Se that is proportional to their difference. The output voltage Vout presents a ripple at a frequency that is double that of the mains and superimposed onto the direct value. If however the band amplitude of the error amplifier is considerably reduced (typically lower than 20 Hz) through the use of a suitable network of compensation comprising at least one capacitor and assuming almost stationery regular functioning, that is with constant effective input voltage and output load, this ripple will be greatly attenuated and the error signal will become constant.

The error signal Se is sent to a multiplier 4 where it is multiplied by a signal Vi given by a part of the mains voltage rectified by the diode bridge 2. The multiplier 4 also receives a signal output from an inverter-squarer block 41 whose input receives a voltage signal Vrap, which is representative of the effective value of the mains voltage obtained through a block 42; the signal output from the block 41 is $1/Vrap^2$.

At the output of multiplier 4 there is a current signal Imolt given by a rectified sine curve whose amplitude depends on the effective mains voltage and the error signal Se. The current signal Imolt flows through the resistor Rm and generates a voltage that represents the sinusoidal reference for the modulation PWM. The voltage signal is input to the non-inverting terminal of an operational amplifier 6 whose inverting input is grounded. With $I_L$ the current that flows on the resistor Rs for the virtual ground principle we have the following.

$$I_L = \frac{Rm}{Rs} Imolt$$

Thus, the current $I_L$ will evolve as a rectified sine curve.

The signal output from the operational amplifier 6 is input to the inverting terminal of a PWM comparator 5 that has its non-inverting terminal connected to an oscillator 7 that supplies a saw-tooth signal whose frequency determines the working frequency of the pre-regulator.

If the signals input to the comparator 5 are equal, the comparator 5 sends a signal to a control block 10 for driving the transistor M and which, in this case, turns it off. A filter positioned at the input of the stage eliminates the switching frequency component and ensures that the current absorbed by the mains has the form of the sinusoid envelope. Another signal output from the oscillator 7 is constituted by a series of pulses in correspondence with the trailing ramps of the saw-tooth signal; the signal is the set input S of a set-reset flip-flop 11, which has another input R that receives the signal output from the comparator 5 and has an output signal Q. The output signal Q is input to a driver 12 that commands the turn on or the turn off of the transistor M.

As long as the boost converter functions correctly, the voltage generated at the output must always be greater than the input voltage. In its most typical embodiment, in a pre-regulator PFC the output voltage is set around 400V so as to be greater than the mains peak voltage in all its interval of variation (from 124.5 to 373.4 V in the case of universal supply). In another embodiment known as "boost follower" or "tracking boost", the output voltage is regulated at a value, depending on the effective input voltage, nevertheless always greater than the peak voltage.

The "tracking boost" approach presents some advantages: at equal frequency the inductance of the inductor of the boost converter is lower, the same as the effective current in the low line voltage MOSFET. This approach is meeting with growing success, especially in mains adaptors for high level notebooks because it makes it possible to use a smaller boost inductor and because the overall efficiency is better. Nevertheless a boost converter of this type presents some disadvantages, such as an increase in the losses in the output diode, the need for a larger output capacitor, and the impossibility of optimizing the DC-DC converter downstream for a constant input voltage.

SUMMARY OF THE INVENTION

In view of the drawbacks described above, it is an object of the present invention to provide a device for power factor correction in a forced switching power supply unit that has simpler circuit architecture than conventional devices.

One embodiment of the present invention provides a device for power factor correction in a forced switching power supply unit. The device includes a converter and a control device coupled to the converter so as to obtain from an input alternating mains voltage a regulated direct voltage on the output terminal. The converter includes a power transistor, and the control device includes an error amplifier whose inverting terminal receives a first signal that is proportional to the regulated voltage and whose non-inverting terminal receives a reference voltage. A drive circuit of the power transistor is coupled to the output terminal of the error amplifier. The control device includes a signal generating circuit for generating a current signal that is representative of the effective input voltage, with the current signal being supplied to the inverting terminal of the error amplifier to vary the regulated voltage in reply to variations in the effective input voltage.

The present invention makes it is possible to produce a device for power factor correction in a forced switching power supply unit according to the "tracking boost" embodiment that has better performance than conventional devices.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
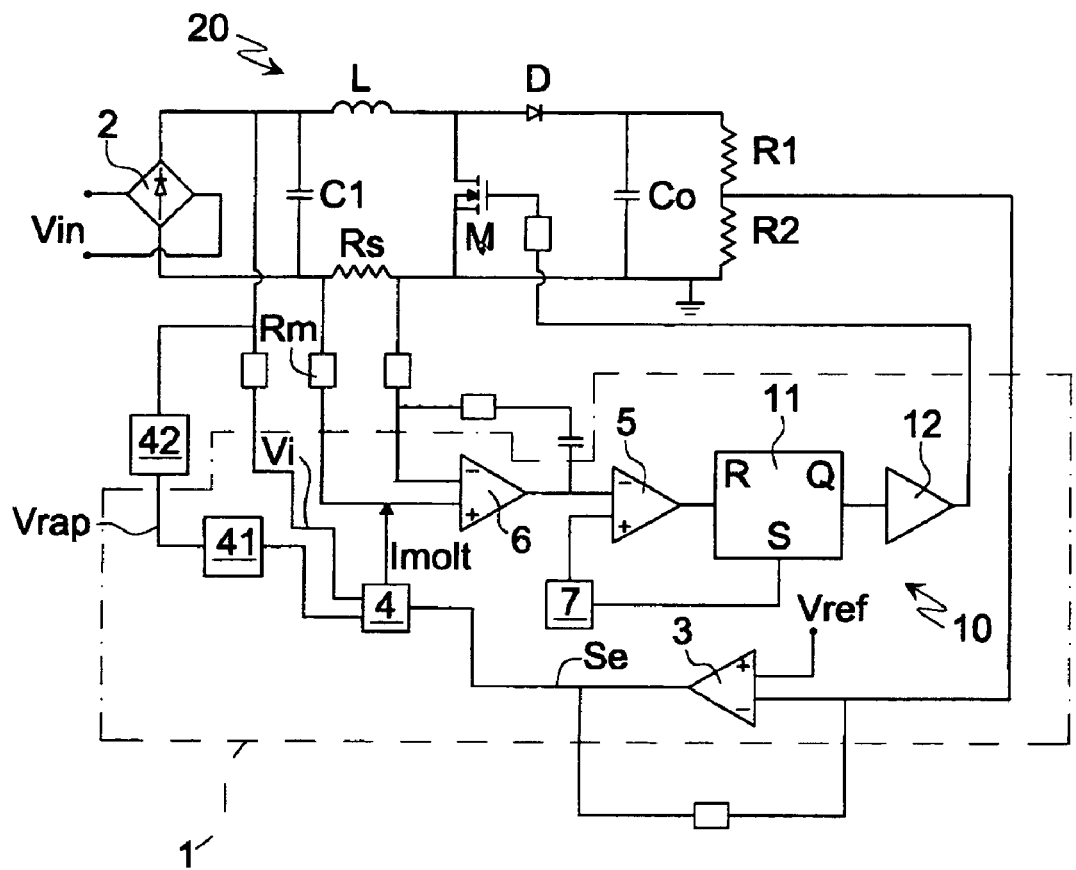
FIG. 1 is a circuit diagram of a conventional PFC for a forced switching power supply unit.
Figure 2:
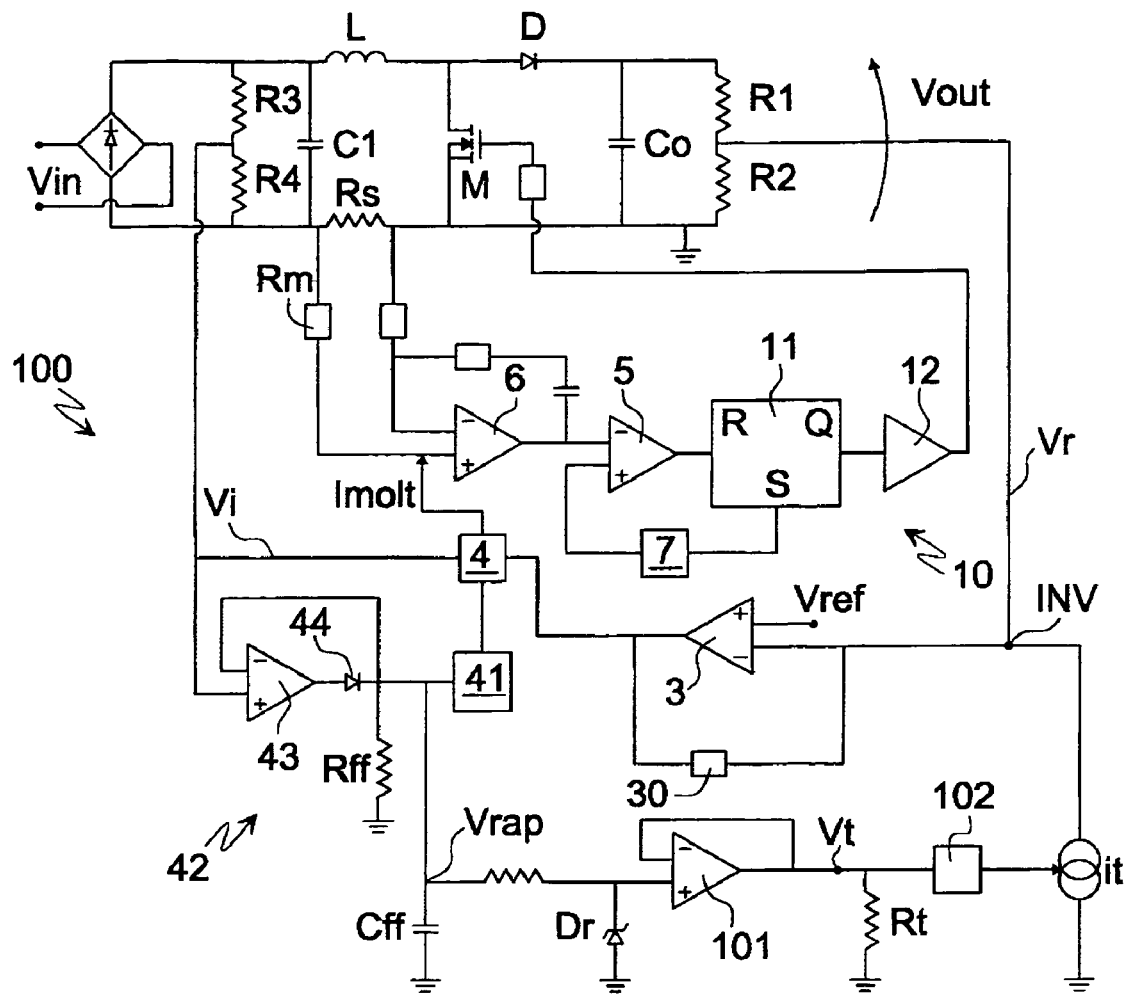
FIG. 2 is a circuit diagram of a PFC for a forced switching power supply unit according to an embodiment of the present invention.

FIG. 2 shows a circuit diagram of a PFC for a forced switching power supply unit according to a first embodiment of the present invention. The elements of FIG. 2 that are the same as in the circuit of FIG. 1 are indicated with the same reference labels. The PFC comprises a converter 20 provided with a full-wave diode rectifier bridge 2 receiving at its input a mains voltage Vin, a capacitor C1 (that acts as a filter for the high frequency) having its terminals connected to the terminals of the diode bridge 2, an inductance L connected to a terminal of the capacitor C1, a MOS power transistor M having its drain terminal connected to a terminal of the inductance L that is downstream of the inductance and having its source terminal connected to ground, a diode D having its anode connected to the common terminal of the inductance L and the transistor M and its cathode connected to another capacitor Co, which has its other terminal connected to ground. The boost converter 20 generates at its output a direct voltage Vout on the capacitor Co which is greater than the maximum mains peak voltage, typically 400 V for systems supplied with European mains or with universal supply. This voltage Vout is the input voltage of the DC-DC converter connected to the PFC.

The boost converter 20 also comprises a detecting resistor Rs connected between the source terminal of the transistor M and a terminal of the diode bridge 2 that closes the circuit enabling the reading of the current that flows through the inductor L.

The PFC also comprises a control circuit 100 for keeping the output voltage Vout at a constant value through a feedback control action. The control circuit 100 comprises an error amplifier 3 for comparing a part of the output voltage Vout, that is the voltage Vr given by Vr=R2*Vout/(R2+R1) (where the resistors R1 and R2 are connected in series and in parallel with the capacitor Co), with a reference voltage Vref, for example of 2.5V. The error amplifier 3 generates an error signal Se that is proportional to their difference. The output voltage Vout presents a ripple at a frequency double that of the mains and superimposed to the direct value. If nevertheless the band amplitude of the error amplifier is considerably reduced (typically lower than 20 Hz) through the use of a suitable network of compensation 30 comprising at least one capacitor and assuming almost stationary regular functioning, that is with constant effective input voltage and output load, this ripple will be exceeded and the error signal will become constant.

The error signal Se is sent to a multiplier 4 where it is multiplied by a signal Vi given by a part of the mains voltage rectified by the diode bridge 2. The multiplier 4 also receives a signal output from an inverter-squarer block 41 whose input receives a voltage signal Vrap, which is representative of the effective value of the mains voltage obtained through a block 42. In an alternative embodiment, the signal Vi is given by a current proportional to the mains voltage, obtained by suitably connecting the block 42 with a resistor to the rectified mains.

At the output of the multiplier 4 there is a current signal Imolt given by a rectified sine curve whose amplitude depends on the amplitude of the signal Vi, on the error signal Se, and on the signal output by the block 41 and equal to $1/Vrap^2$. The current signal Imolt, which represents the sinusoidal reference for the PWM modulation, flows through the resistor Rm and generates a voltage signal at its terminals. The voltage signal is input to the non-inverting terminal of an operational amplifier 6 whose inverting input is grounded. For the principle of virtual ground, the voltage to the non-inverting terminal will also be equal to zero, therefore, indicating with $I_L$ the current that flows on the resistor Rs, we have the following.

$$I_L = \frac{Rm}{Rs} Imolt$$

The current $I_L$ will evolve like the current Imolt, that is like a rectified sine curve.

The signal output from the operational amplifier 6 is input to the inverting terminal of a PWM comparator 5 that has its non-inverting terminal connected to an oscillator 7 that supplies a saw-tooth signal whose frequency determines the operating frequency of the pre-regulator.

If the signals input to the comparator 5 are equal, the comparator 5 sends a signal to a control block 10 for driving the transistor M and which, in this case, turns it off. A filter positioned at the input of the stage eliminates the switching frequency component and ensures that the current absorbed by the mains has the form of the sinusoid envelope. Another signal output from the oscillator 7 is constituted by a series of pulses in correspondence with the trailing ramps of the saw-tooth signal; the signal is the set input S of a set-reset flip-flop 11, which has another input R that receives the signal output by the comparator 5 and has an output signal Q. The output signal Q is input to a driver 12 that commands the turn on or the turn off of the transistor M.

The device 42 comprises an operational amplifier 43 and a diode 44 having its anode connected to the output of the amplifier 43. The feedback between the cathode of the diode 44 and the inverting terminal of the operational amplifier 43 ensures that the unit functions like an ideal diode, with direct fall practically equal to zero. The amplifier 43 has its non-inverting terminal connected to the common terminal of the resistors R3 and R4, and the device 42 comprises a capacitor Cff connected between the cathode of the diode 44 and ground. At the terminals of capacitor Cff there will be a voltage equal to the peak value of the voltage applied to the non-inverting input of the operational amplifier 43. A resistor Rff permits the discharge toward ground of the capacitor so that the voltage at its terminals can adjust to decreases of the effective input voltage; this discharge must be imperceptible in the sphere of each mains half-cycle so that the voltage at its terminals is as near as possible to a direct voltage. With the above-mentioned limits and considering the values of capacitance and resistance that can be obtained in integrated form, in preferred embodiments only the resistor Rff is integrated within the chip in which the control device 100 is realized, while the capacitance Cff is of the discrete type. The voltage Vrap is coupled to a buffer 101 so as not to discharge the capacitance Cff any further; between the output of the buffer 101 and ground a resistor Rt is connected that defines a current equal to the voltage Vrap divided by the resistor. Thus the current It that flows through the resistor Rt is given by the following.

$$It = \frac{Vrap}{Rt} = \frac{KpVpk}{Rt} = \sqrt{2}\,\frac{KpVac}{Rt}$$

where voltage Vpk is the peak voltage value at the input of the pre-regulator, voltage Vac is its effective value, and Kp is the partition ratio R4/(R3+R4). The current It, supplied by the output stage of the buffer 101, is internally mirrored with an assigned ratio Ks by the mirror 102 and the current thus obtained is absorbed so as to modify the setting of the output voltage Vout. In fact the current It varies the total current on the inverting terminal of the error amplifier 3 and this makes the output voltage Vout proportional to the value of the effective input voltage. It is convenient to select Ks=1 in order to minimize the tolerance on Ks, from which the tolerance of the output voltage depends. Applying the balance equation of the currents at the node INV we have the following.

$$\frac{Vout - Vref}{R1} = \frac{Vref}{R2} + It = \frac{Vref}{R2} + \sqrt{2}\,\frac{Kp}{Rt}Vac$$

which, resolved in regard to Vout, supplies the following.

$$Vout = Vref\left(1 + \frac{R1}{R2}\right) + \sqrt{2}\,Kp\frac{R1}{Rt}Vac$$

and we obtain, as desired, that the output voltage varies in accordance with the variations in the input voltage. In addition, if the resistor Rt is not connected, the current set is equal to zero and therefore we obtain the functioning of the traditional boost at fixed output voltage.

Further, there is a Zener diode Dr connected to the non-inverting terminal of the buffer 101. This limits the maximum voltage applied to the input of the buffer 101 at the value Vz, suitably selected, so that, if the input voltage exceeds the maximum specified value, the output voltage cannot increase any further. This prevents the boost diode, the output capacitor, and the converter downstream from being risked.

Figure 3:
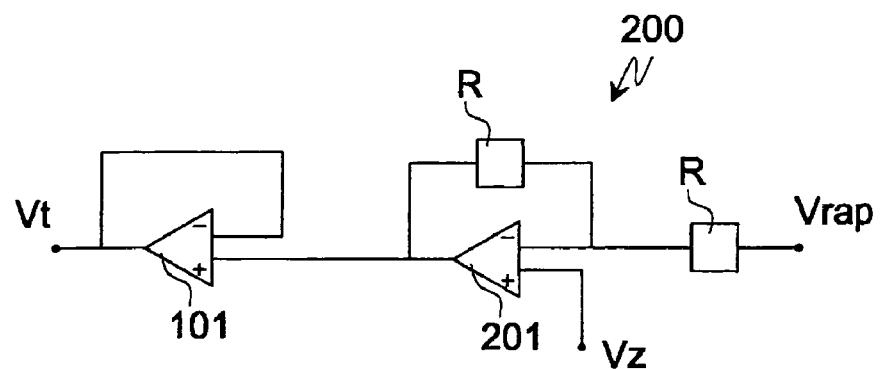
FIG. 3 shows a device used in place of the Zener diode of the circuit of FIG. 2 according to another embodiment of the present invention.

FIG. 3 shows a device 200 used in place of the Zener diode Dr in the circuit of FIG. 2 in accordance with another embodiment of the present invention. The voltage Vrap is coupled to the inverting input of a buffer 201 configured at unit-gain at whose non-inverting input the voltage Vz is present. The output of the buffer 201 is input to the non-inverting terminal of the buffer 101 whose output can be expressed as follows.

$$\frac{Vrap - Vz}{R} = \frac{Vz - Vt}{R}$$

From this we obtain the following.

$$Vt = 2Vz - Vrap$$

The current It is given by the following.

$$It = \frac{Vt}{Rt} = \frac{2Vz - \sqrt{2}\,KpVac}{Rt}$$

The current It is internally mirrored with unit-ratio so as to minimize the tolerance on the ratio and the current thus obtained is delivered by the pin INV so as to modify the setting of the output voltage Vout. Applying the balance equation of the currents at the node INV we have the following.

$$\frac{Vout - Vref}{R1} + It = \frac{Vref}{R2}$$

From this, substituting the above deduced expression of It and resolving in regard to Vout, we deduce the following.

$$Vout = Vref\left(1 + \frac{R1}{R2}\right) - 2\frac{R1}{Rt}Vz + \sqrt{2}\,Kp\frac{R1}{Rt}Vac$$

It can be observed that, with this technique, the smaller the current that is generated, the greater will be the output voltage. The maximum value will be obtained obviously for It=0 and thus, mirroring an intrinsically positive current, we automatically obtain It≧0 and a consequent limitation of the output voltage generated, with this making the use of a Zener diode not necessary.

In an alternative embodiment, the device 42 contains only the RC elements connected to form a low-pass filter.

In another alternative embodiment, the reading of the mains voltage is made in current so the device 42 can be a simple mirror of a current that is delivered on the capacitor Cff, or must contain a current-voltage converter in which the voltage generated is applied to the non-inverting input of the operational amplifier 43.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A device for power factor correction in a forced switching power supply unit, the device comprising:
   a converter; and
   a control device coupled to the converter so as to obtain from an input alternating mains voltage a direct regulated voltage on an output terminal,
   wherein the converter comprises a power transistor,
   the control device comprises an error amplifier having its inverting terminal coupled to a first signal that is proportional to the regulated voltage, and its non-inverting terminal coupled to a reference voltage,
   a drive circuit for the power transistor is coupled to an output terminal of the error amplifier,
   the control device further comprises a signal generating circuit for generating a current signal that is representative of the effective input voltage, the current signal being coupled to the inverting terminal of the error amplifier to vary the regulated voltage in reply to variations in the effective input voltage,
   the signal generating circuit comprises:
      a first circuit for supplying a voltage signal that is representative of the effective input voltage; and
      a resistor at whose terminals the voltage signal is present and in which flows the current signal that is representative of the effective input voltage,
   the converter further comprises a second circuit for rectifying the input voltage, and
   the first circuit comprises at least one diode and at least one capacitor, the diode having its anode coupled to the second circuit and its cathode coupled to the capacitor.

2. The device according to claim 1, wherein the first circuit further comprises an operational amplifier having its non-inverting input terminal coupled to the second circuit, its output terminal connected to the anode of the diode, and its inverting input terminal connected to the cathode of the diode.

3. The device according to claim 1,
   wherein the control device further comprises a third circuit for outputting a value that is inverse of the square of the signal that is representative of the effective input voltage, and
   the drive circuit comprises:
      a multiplier that is coupled to the error amplifier, the multiplier multiplying an output signal of the error amplifier, an output signal of the third circuit, and a voltage signal that is proportional to an output signal of the second circuit;
      an operational amplifier having one input terminal coupled to an output signal of the multiplier and another input terminal coupled to another reference voltage;
      a comparator for comparing an output signal of the operational amplifier with a signal output from an oscillator; and
      a control circuit connected to the output of the comparator, the control circuit generating a drive signal for the power transistor.

4. A device for power factor correction in a forced switching power supply unit, the device comprising:
a converter; and
a control device coupled to the converter so as to obtain from an input alternating mains voltage a direct regulated voltage on an output terminal,
wherein the converter comprises a power transistor,
the control device comprises an error amplifier having its inverting terminal coupled to a first signal that is proportional to the regulated voltage, and its non-inverting terminal coupled to a reference voltage,
a drive circuit for the power transistor is coupled to an output terminal of the error amplifier,
the control device further comprises a signal generating circuit for generating a current signal that is representative of the effective input voltage, the current signal being coupled to the inverting terminal of the error amplifier to vary the regulated voltage in reply to variations in the effective input voltage, and
the signal generating circuit comprises:
a first circuit for supplying a voltage signal that is representative of the effective input voltage;
a resistor at whose terminals the voltage signal is present and in which flows the current signal that is representative of the effective input voltage;
a buffer coupled between the first circuit and the resistor; and
a current mirror for mirroring the current signal that flows in the resistor, the current mirror being coupling to the inverting terminal of the error amplifier.

5. A device for power factor correction in a forced switching power supply unit, the device comprising:
a converter; and
a control device coupled to the converter so as to obtain from an input alternating mains voltage a direct regulated voltage on an output terminal,
wherein the converter comprises a power transistor,
the control device comprises an error amplifier having its inverting terminal coupled to a first signal that is proportional to the regulated voltage, and its non-inverting terminal coupled to a reference voltage,
a drive circuit for the power transistor is coupled to an output terminal of the error amplifier,
the control device further comprises a signal generating circuit for generating a current signal that is representative of the effective input voltage, the current signal being coupled to the inverting terminal of the error amplifier to vary the regulated voltage in reply to variations in the effective input voltage,
the signal generating circuit comprises:
a first circuit for supplying a voltage signal that is representative of the effective input voltage;
a resistor at whose terminals the voltage signal is present and in which flows the current signal that is representative of the effective input voltage; and
a second circuit for limiting a value of the voltage signal, and
the second circuit comprises a Zener diode that is coupled to the resistor to limit to a preset value the value of the voltage signal.

6. A device for power factor correction in a forced switching power supply unit, the device comprising:
a converter; and
a control device coupled to the converter so as to obtain from an input alternating mains voltage a direct regulated voltage on an output terminal,
wherein the converter comprises a power transistor,
the control device comprises an error amplifier having its inverting terminal coupled to a first signal that is proportional to the regulated voltage, and its non-inverting terminal coupled to a reference voltage,
a drive circuit for the power transistor is coupled to an output terminal of the error amplifier,
the control device further comprises a signal generating circuit for generating a current signal that is representative of the effective input voltage, the current signal being coupled to the inverting terminal of the error amplifier to vary the regulated voltage in reply to variations in the effective input voltage,
the signal generating circuit comprises:
a first circuit for supplying a voltage signal that is representative of the effective input voltage;
a resistor at whose terminals the voltage signal is present and in which flows the current signal that is representative of the effective input voltage; and
a second circuit for limiting a value of the voltage signal, and
the second circuit comprises an operational amplifier having its inverting terminal coupled to the output of the first circuit, its non-inverting terminal connected to another reference voltage, and its output terminal coupled to a terminal of the resistor and coupled to the inverting terminal through another resistor.

7. A switching power supply comprising:
a device for power factor correction; and
a DC-DC converter coupled to the output of the PFC,
wherein the device for power factor correction includes:
a converter including a power transistor;
a control device coupled to the converter so as to obtain from an input alternating mains voltage a direct regulated voltage on an output terminal, the control device including an error amplifier having its inverting terminal coupled to a first signal that is proportional to the regulated voltage, and its non-inverting terminal coupled to a reference voltage; and
a drive circuit for the power transistor is coupled to an output terminal of the error amplifier,
the control device of the device for power factor correction further includes a signal generating circuit for generating a current signal that is representative of the effective input voltage, the current signal being coupled to the inverting terminal of the error amplifier to vary the regulated voltage in reply to variations in the effective input voltage, and
the signal generating circuit of the control device of the device for power factor correction comprises:
a first circuit for supplying a voltage signal that is representative of the effective input voltage;
a resistor at whose terminals the voltage signal is present and in which flows the current signal that is representative of the effective input voltage;
a buffer coupled between the first circuit and the resistor; and
a current mirror for mirroring the current signal that flows in the resistor, the current mirror being coupling to the inverting terminal of the error amplifier.

8. The switching power supply according to claim 7,
wherein the converter the device for power factor correction further includes a second circuit for rectifying the input voltage, and
the first circuit comprises at least one diode and at least one capacitor, the diode having its anode coupled to the second circuit and its cathode coupled to the capacitor.

9. The switching power supply according to claim 8, wherein the first circuit further comprises an operational amplifier having its non-inverting input terminal coupled to the second circuit, its output terminal connected to the anode of the diode, and its inverting input terminal connected to the cathode of the diode.

10. The switching power supply according to claim 8,
wherein the control device of the device for power factor correction further includes a third circuit for outputting a value that is inverse of the square of the signal that is representative of the effective input voltage, and
the drive circuit of the device for power factor correction comprises:
a multiplier that is coupled to the error amplifier, the multiplier multiplying an output signal of the error amplifier, an output signal of the third circuit, and a voltage signal that is proportional to an output signal of the second circuit;
an operational amplifier having one input terminal coupled to an output signal of the multiplier and another input terminal coupled to another reference voltage;
a comparator for comparing an output signal of the operational amplifier with a signal output from an oscillator; and
a control circuit connected to the output of the comparator, the control circuit generating a drive signal for the power transistor.

11. The switching power supply according to claim 7, wherein the signal generating circuit of the control device of the device for power factor correction further comprises a second circuit for limiting a value of the voltage signal.

12. The switching power supply according to claim 11, wherein the second circuit comprises a Zener diode that is coupled to the resistor to limit to a preset value the value of the voltage signal.

13. The switching power supply according to claim 11, wherein the second circuit comprises an operational amplifier having its inverting terminal coupled to the output of the first circuit, its non-inverting terminal connected to another reference voltage, and its output terminal coupled to a terminal of the resistor and coupled to the inverting terminal through another resistor.

14. An electronic device including at least one switching power supply according to claim 7.

15. A fluorescent lamp fixture including at least one switching power supply according to claim 7.

* * * * *